United States Patent
Gossmann et al.

(10) Patent No.: US 9,137,069 B2
(45) Date of Patent: Sep. 15, 2015

(54) SYSTEMS AND METHODS TO FREQUENCY SHIFT UNWANTED SIGNAL COMPONENTS

(75) Inventors: Timo Gossmann, Neubiberg (DE);
Andreas Holm, Vaterstetten (DE)

(73) Assignee: Intel Deutschland GmbH, Neubiberg (DE)

( * ) Notice: Subject to any disclaimer, the term of this patent is extended or adjusted under 35 U.S.C. 154(b) by 403 days.

(21) Appl. No.: 13/568,214

(22) Filed: Aug. 7, 2012

(65) Prior Publication Data
US 2014/0044214 A1    Feb. 13, 2014

(51) Int. Cl.
*H04L 25/03* (2006.01)
*H04L 27/20* (2006.01)
*H04L 27/36* (2006.01)

(52) U.S. Cl.
CPC .......... *H04L 27/2032* (2013.01); *H04L 27/366* (2013.01)

(58) Field of Classification Search
CPC ..... H04L 27/12; H04L 27/36; H04L 27/2691; H04L 27/2657; H04L 27/2626; H04L 27/362; H04L 27/366; H04L 27/2032
USPC .................................. 375/295, 296, 297, 298
See application file for complete search history.

(56) References Cited

U.S. PATENT DOCUMENTS

| 4,791,577 | A | 12/1988 | Winter | |
|---|---|---|---|---|
| 6,891,907 | B1 | 5/2005 | Mabuchi | |
| 7,660,361 | B2 | 2/2010 | Sakoda | |
| 2006/0057997 | A1* | 3/2006 | Hausdorf et al. | 455/264 |
| 2007/0165745 | A1* | 7/2007 | Fonden et al. | 375/297 |
| 2008/0246875 | A1* | 10/2008 | Ashby et al. | 348/441 |
| 2008/0280579 | A1* | 11/2008 | Cloutier et al. | 455/259 |
| 2011/0222592 | A1* | 9/2011 | Asami | 375/226 |
| 2013/0003890 | A1* | 1/2013 | Schwent et al. | 375/296 |
| 2013/0287137 | A1* | 10/2013 | Menkhoff | 375/295 |

OTHER PUBLICATIONS

Final Office Action dated Nov. 6, 2013 for U.S. Appl. No. 13/085,984. 10 Pages.
Office Action dated Jun. 5, 2013 for U.S. Appl. No. 13/085,984.
U.S. Appl. No. 13/085,984, filed Apr. 13, 2011. 38 pages.
Notice of Allowance Dated Feb. 25, 2014 U.S. Appl. No. 13/085,984.

* cited by examiner

*Primary Examiner* — Syed Haider
(74) *Attorney, Agent, or Firm* — Eschweiler & Associates, LLC (57) ABSTRACT

A transmission circuit includes a shift circuit, a second shift circuit, and a modulation circuit. The shift circuit is configured to select a shift amount according to shift parameters and to introduce the shift amount in a first direction into in phase and quadrature phase baseband signals. The second circuit is configured to selectively introduce the shift amount in a second direction into local oscillator signals. The modulation circuit is configured to modulate the shifted baseband signals onto the shifted local oscillator signals to generate a composite modulated output signal. Unwanted components of the output signal are shifted away from original or specified limits. Wanted components of the output signal are unshifted.

17 Claims, 7 Drawing Sheets

SYSTEMS AND METHODS TO FREQUENCY SHIFT UNWANTED SIGNAL COMPONENTS

BACKGROUND OF THE INVENTION

Modern portable communication devices (e.g., cell phones, PDAs, etc.) comprise transmission chains configured to transmit information wirelessly using electromagnetic waves. The transmission chains include a transmitter that utilizes quadrature modulation to encode data onto a composite modulated output signal. The output signal can then be wirelessly transmitted by an antenna using amplitude modulation and frequency modulation. The amplitude modulation varies the strength or amplitude of the output signal. The frequency modulation varies the frequency of the output signal.

DETAILED DESCRIPTION OF THE INVENTION

The present invention will now be described with reference to the attached drawing figures, wherein like reference numerals are used to refer to like elements throughout, and wherein the illustrated structures and devices are not necessarily drawn to scale.

Figure 1A:
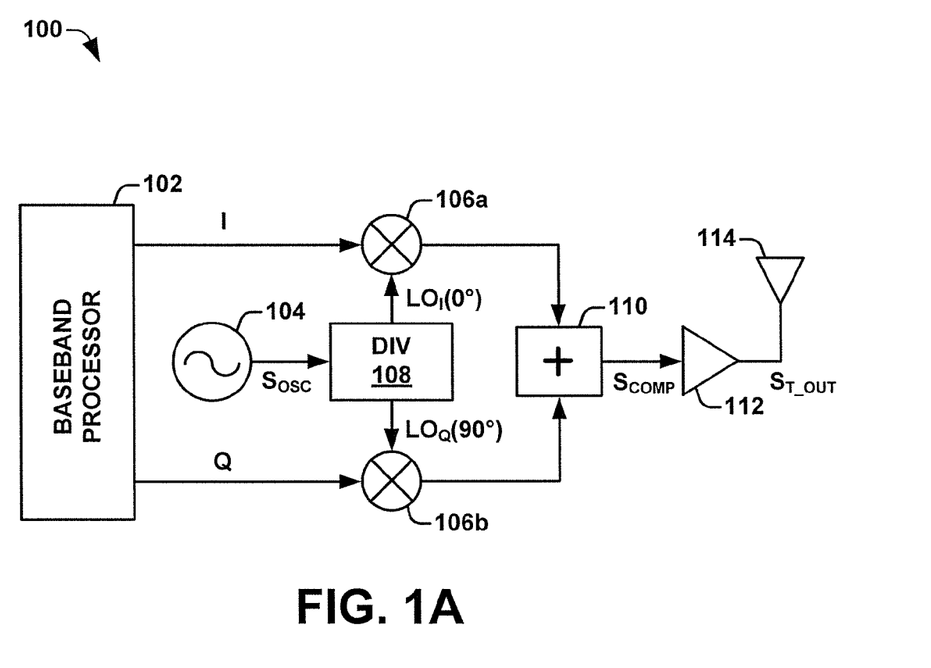
FIG. 1A is a diagram illustrating a transmitter that utilizes quadrature modulation.

FIG. 1A is a diagram illustrating a transmitter 100 that utilizes quadrature modulation to generate an output signal without frequency shifting unwanted components. The modulation is used to encode data onto a composite modulated output signal that can be wirelessly transmitted by an antenna, through the use of amplitude modulation (i.e., varying the strength of the output signal) and frequency modulation (i.e., varying the frequency of the output signal).

A baseband processor 102 is configured to generate in-phase (I) and quadrature phase (Q) equivalent baseband signals having a frequency range centered around zero Hz (e.g., −8 MHz to 8 MHz). The I and Q equivalent baseband signals are output from the baseband processor 102 to respective up-conversion mixers 106a and 106b. A local oscillator 104 is configured to generate an oscillator output signal $S_{OSC}$ (e.g., a sine wave) at a high frequency (e.g., 10 GHz), which is provided to a quadrature divider 108 that is configured to divide the frequency of the oscillator output signal $S_{OSC}$ by a division factor to generate local oscillator signals, $LO_I(0°)$ and $LO_Q(90°)$, which are offset by 90°. The local oscillator signals are provided to the up-conversion mixers 106a and 106b, which modulate the I and Q equivalent baseband signals onto the local oscillator signals, thereby up-converting the frequency of the I and Q equivalent baseband signals and generating mixer output signals having a frequency equal to that of the local oscillator signals. The mixer output signals are combined by an adder 110 to form a composite modulated output signal $S_{COMP}$ that is provided to one or more amplification stages 112 before being received by an antenna 114 for wireless transmission.

The one or more amplification stages 112 are configured to amplify the composite modulated output signal $S_{COMP}$, having a small amount of energy, to form a transmitter output signal $S_{T\_OUT}$ with a larger amount of energy.

Some communication standards, such as long term evolution (LTE) have the requirement that the actual transmission bandwidth of an output signal is only a fraction of a complete LTE transmit bandwidth configuration. The smallest unit of a transmitted signal is 1 resource block (RB) which has a physical bandwidth, such as 180 kHz for a channel bandwidth of 20 MHz. A system, such as transmitter 100, can include, for example, 1 to 100 RBs depending on a required data rate or service. Typically, one restriction is that the used RBs are consecutive. Thus, it is possible that only one or a few RBs occur at edges (upper or lower) of a channel. Such a configuration imposes requirements on the transmitter 100, such as those with the LTE Standard (3GPP TS 36.101), including carrier suppression and image suppression.

The transmitter 100 includes a vector or sideband modulator via the baseband processor 102, the mixers 106a and 106b, and the adder 110. The transmitter 100 performs IQ vector modulation to generate the composite modulated output signal $S_{COMP}$. However, the modulator has another parameter or characteristic, referred to as third order modulation (IM3 or counter IM3). This characteristic results in generation of an IM3 component (generated by a $3^{rd}$ order nonlinearity of the modulator). Transmission standards, such as the LTE standard described above, require that the IM3 component exist outside specified limits.

Figure 1B:
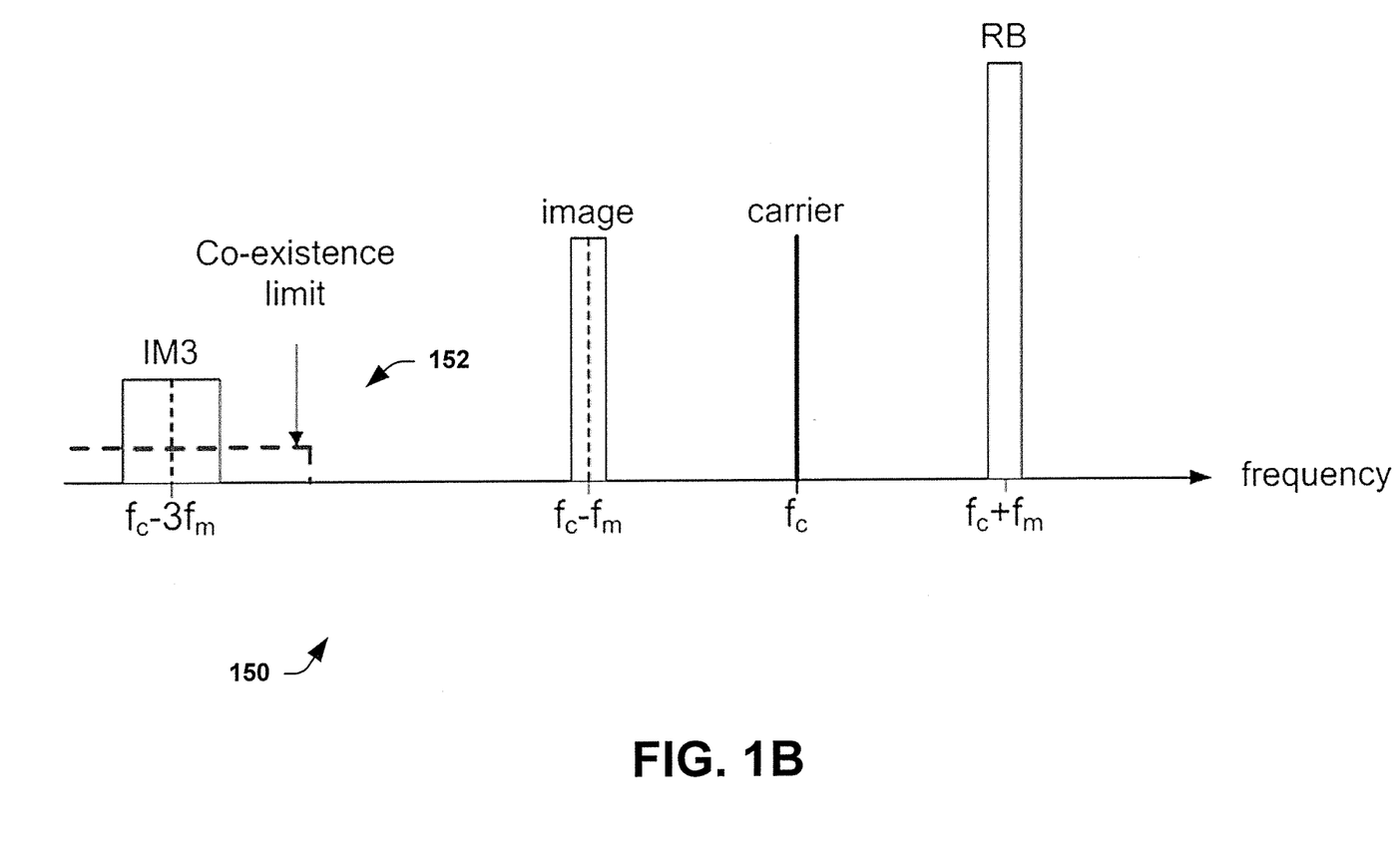
FIG. 1B is a graph illustrating a transmission spectrum generated by vector modulation.

FIG. 1B is a graph 150 illustrating a transmission spectrum generated by vector modulation, such as the transmitter 100. The transmission spectrum in this example is for an LTE based system with 1 RB allocation.

The graph 150 includes an x-axis depicting frequency and a y-axis depicting amplitude. The spectrum includes a variety of components including RB, carrier component, image component, and an IM3 component. The carrier component or frequency ($f_c$) is specified and shown in the graph 150. The carrier component $f_c$ is an unwanted signal and typically suppressed.

The RB component is essential the wanted or desired signal for transmission. The RB component is at or around a frequency specified by the carrier frequency ($f_c$) and a modulation frequency ($f_m$). The modulation frequency or baseband frequency fm is typically a few MHz. Thus, the wanted signal is transferred to $f_c+f_m$.

The image component is centered about a frequency specified by the $f_c-f_m$. Note that the image component is shown to the left of the $f_c$ by an amount specified by the baseband frequency, $f_m$. The image component is an unwanted signal and is typically suppressed.

The IM3 component, described above, is a third order based component and is shifted from the carrier frequency $f_c$ by a factor of 3 or a third order. Thus, the IM3 component is centered about a frequency specified by $f_c-3f_m$. For modulated RBs, the IM3 component is spectrally widened by a factor of 3. The IM3 component is an unwanted signal and is typically restricted by specified limits.

It is noted that typical communication standards or systems have linearity requirements specified acceptably by means of adjacent channel leakage ratio (ACLR), which incorporates requirements on the IM3 component. However, for certain LTE configurations, out of band spurious emission requirements can be violated even the linearity and compliance with the ACLR is sufficient.

The co-existence requirement(s) restrict signal components from interfering with other bands, such as the public safety band. The IM3 is a spurious emission and is shown falling within the co-existence requirement 152 in FIG. 1B. The co-existence requirement 152 does not permit transmission components within the limit or range specified by the requirement 152. Here, the co-existence requirement 152 is violated by the IM3 component.

One technique to comply with the co-existence requirements and suppress the IM3 component is to significantly improve the linearity of the transmitter 100. This improvement requires substantial additional current consumption, and therefore power consumption. Further, this improved linearity exceeds the requirements for ACLR, which can be disadvantageous in terms of features such as talk time. The increased linearity also results in improved suppression of the modulator IM3.

Figure 2A:
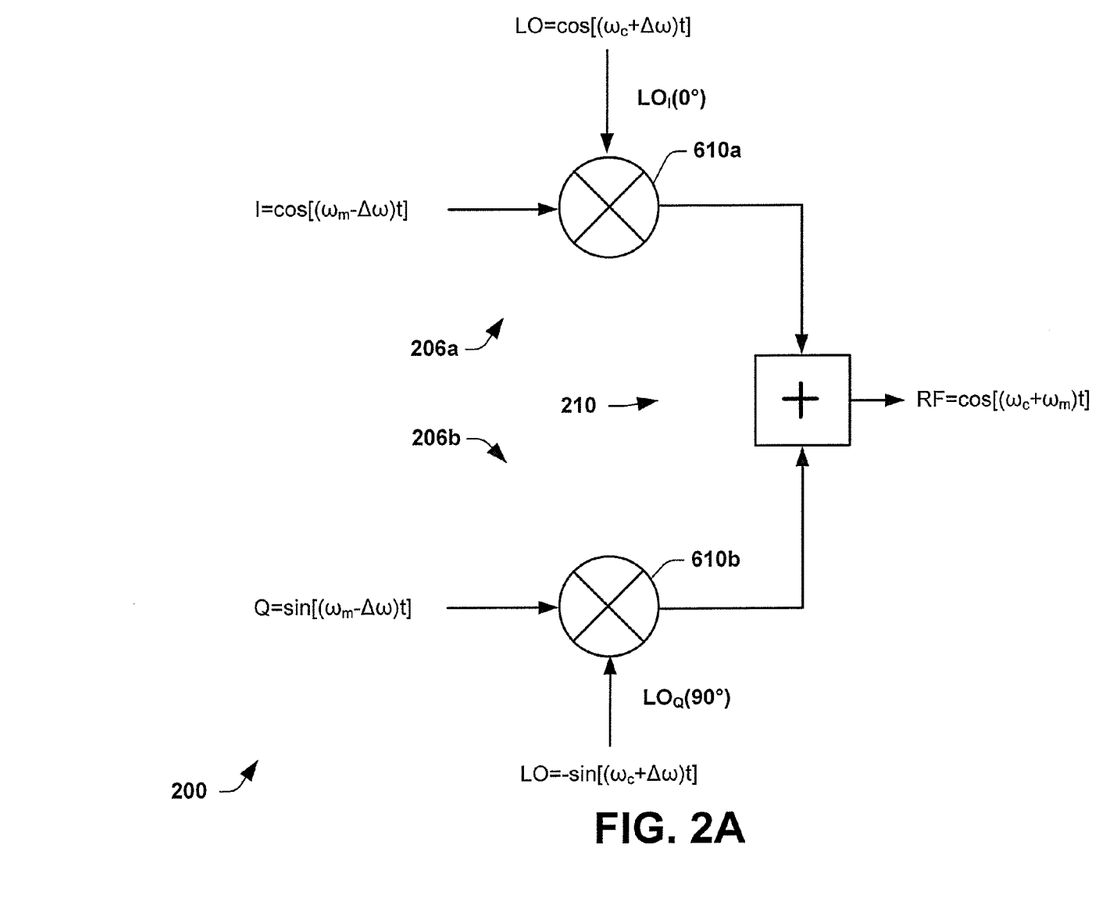
FIG. 2A is a diagram illustrating a vector modulator that frequency shifts unwanted signal components.

FIG. 2A is a diagram illustrating a vector modulator 200 that frequency shifts unwanted signal components. The diagram is simplified to facilitate understanding of the embodiment and variations thereof. The modulator 200 shifts unwanted frequency components to mitigate the unwanted frequency components and comply with co-existence requirements.

The vector modulator 200 includes an upper mixer 206a, a lower mixer 206b, and an adder 210. Shifted baseband signals I and Q are provided to the upper and lower mixers 206a and 206b. Additionally, shifted local oscillator signals LO are also provided to the upper and lower mixers 206a and 206b.

The shifted baseband signals are typically generated by a baseband processor, such as the processor 102 described above, but are shifted by an amount referred to as a shift amount. The shifted baseband signals have a frequency range centered about zero prior to being shifted. The local oscillator signals are typically generated by a local oscillator, such as the oscillator 104 described above. The local oscillator signals are generally at a relatively high frequency (e.g., 10 GHz). Additionally, the local oscillator signals are also shifted in frequency by the shift amount, but in a direction opposite that of the shifted baseband signals. Generally, the baseband signals are shifted to the left or toward origin by the shift amount and the local oscillator signals are shifted to the right or away from origin by the shift amount.

The upper mixer 206a and the lower mixer 206b modulate the shifted baseband signals onto the local oscillator signals, thereby up-converting the frequency and generating mixer output signals equal to that of the shifted local oscillator signals. The mixer output signals are combined by the adder 210 to form a composite modulated output signal with shifted unwanted components. The output signal can then be amplified and provided to an antenna for wireless transmission.

The shifted baseband signals are obtained as shown in FIG. 2A. The shifted baseband signals are obtained by:

$I = \cos[(\omega_m - \Delta\omega)t]$, where $\omega_m = 2\pi * f_m$ $Q = \sin[(\omega_m - \Delta\omega)t]$ The shifted local oscillator signals are obtained by:

LO (upper mixer 206a) = $\cos[(\omega_c + \Delta\omega)t]$, where $\omega_c = 2\pi f_c$ LO (lower mixer 206b) = $-\sin[(\omega_c - \Delta\omega)t]$ The mixer output signals are combined by the adder to yield the modulated output signal as:

RF = $\cos[(\omega_c + \omega_m)t]$, thus the wanted components remain unshifted.

Figure 2B:
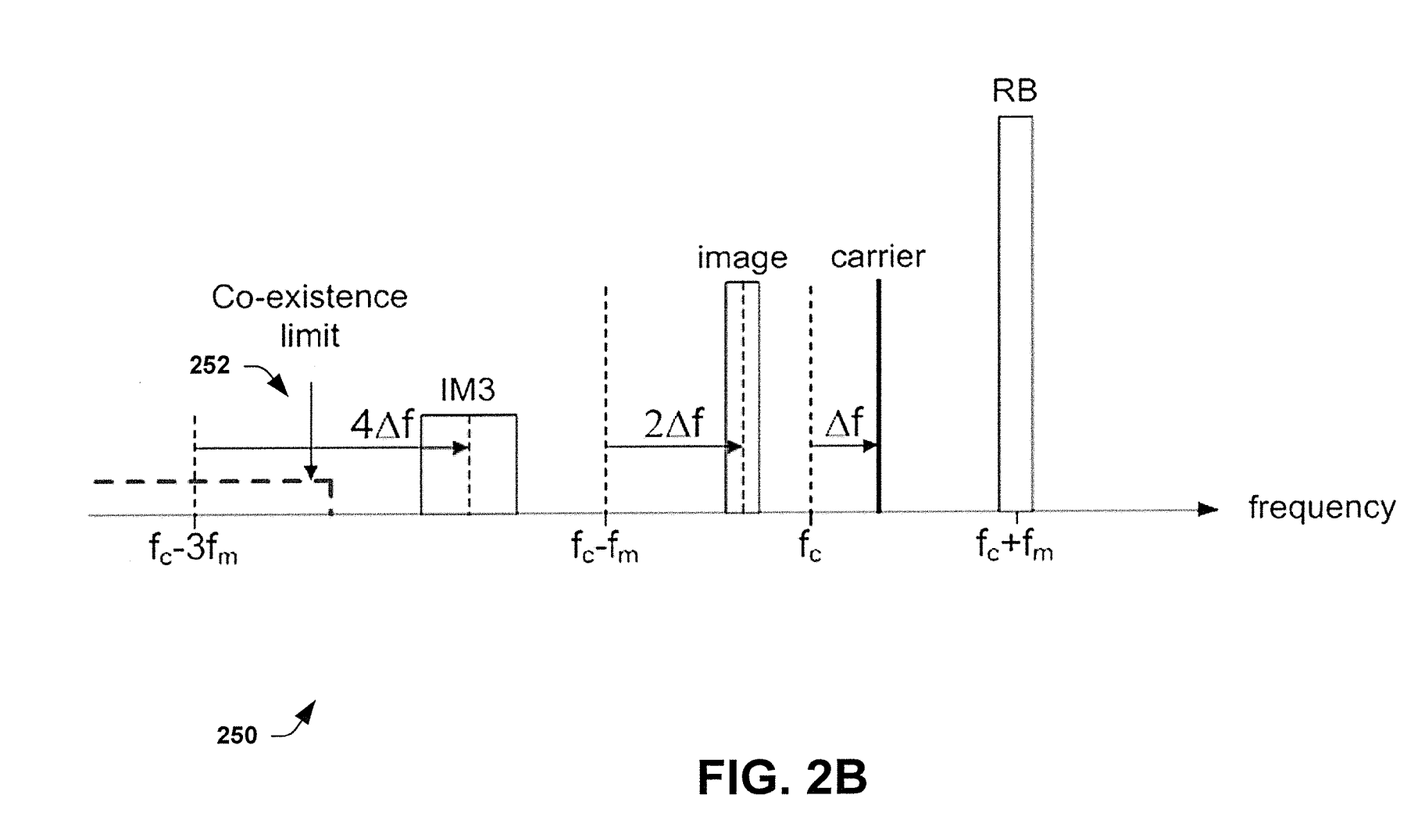
FIG. 2B is a graph illustrating a transmission spectrum generated by vector modulation by a transmitter showing frequency shifting of unwanted signal components.

FIG. 2B is a graph 250 illustrating a transmission spectrum generated by vector modulation by a transmitter, such as the transmitter 200. The transmission spectrum in this example is for an LTE based system with 1 RB allocation.

The graph 250 includes an x-axis depicting frequency and a y-axis depicting amplitude. The spectrum includes a variety of shifted components including RB, carrier component, image component, and an IM3 component. The carrier component or frequency ($f_c$) is specified but shifted by the amount of $\Delta f$ to $f_c + \Delta f$ and shown in the graph 250.

The RB component is the wanted or desired signal for transmission. The RB component remains at or around a frequency specified by the fc and a modulation frequency ($f_m$), similar to that shown in FIG. 1B. The modulation frequency or baseband frequency fm is typically a few MHz. Thus, the wanted signal is transferred to $f_c + f_m$.

The image component is centered about a frequency specified by the $f_c - f_m$, but shifted by an amount ($2\Delta f$), where $\Delta\omega = 2\pi * \Delta f$. Thus, the image component is centered about a frequency specified by:

$f_c - f_m + 2\Delta f$.

The image component is an unwanted signal and is typically suppressed.

The IM3 component is a third order based component and is shifted from the carrier frequency $f_c$ by a factor of 3 or a third order plus a shift amount. Thus, the IM3 component is centered about a frequency specified by:

$f_c - 3f_m + 4\Delta f$.

The IM3 component is also an unwanted signal and is described above in additional detail.

The co-existence limit is shown at 252. Here, it can be seen that by shifting the IM3 component by $4\Delta f$, the IM3 component does not violate the specified co-existence limit 252.

As a result, other techniques, such as increased linearity, are not required to comply with the co-existence limit. Thus, power consumption can be reduced.

Figure 3:
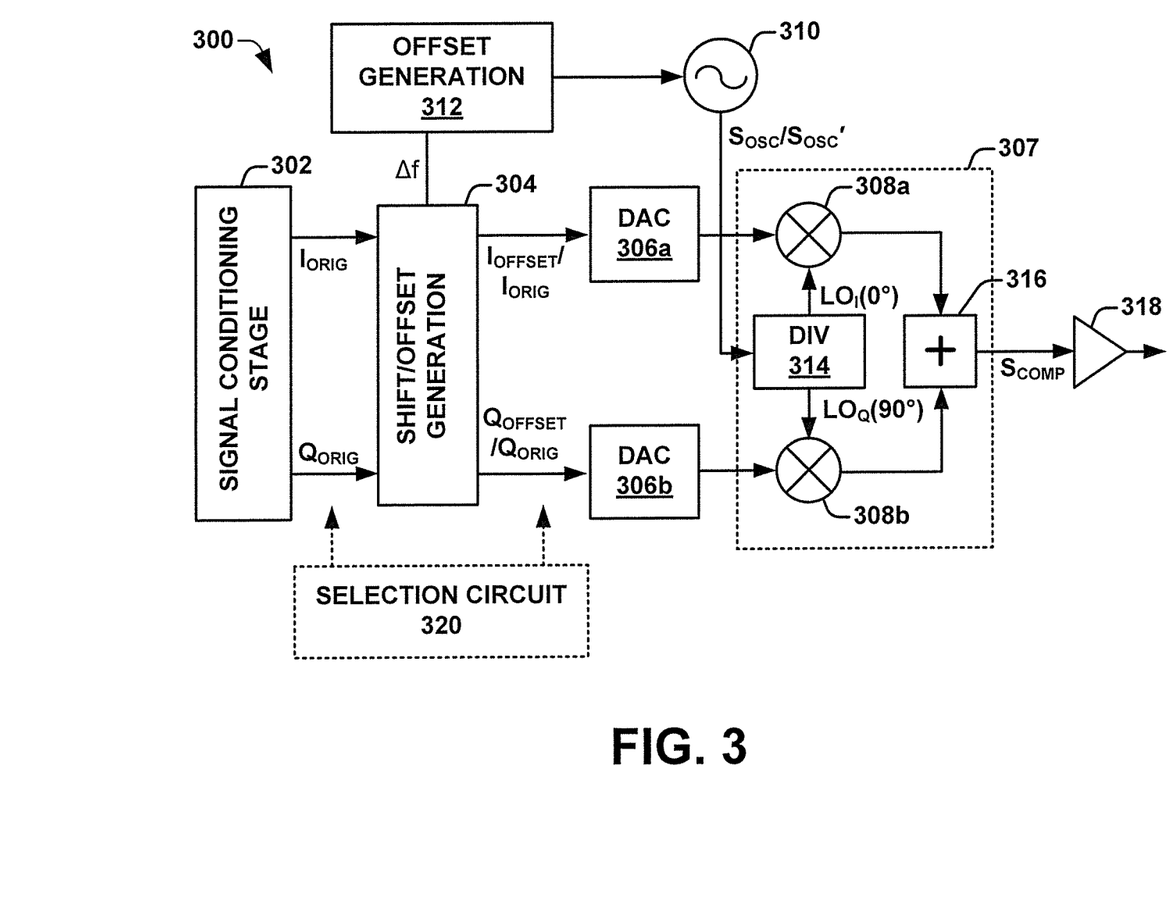
FIG. 3 is a diagram illustrating a transmission circuit for frequency shifting unwanted signal components.

FIG. 3 is a diagram illustrating a transmission circuit 300 for shifting unwanted signal components. The transmission circuit 300 comprises a first shift/offset generation circuit 304 and a second offset generation circuit 312. The first offset generation circuit 304 is configured to selectively introduce a first frequency shift into in-phase (I) and quadrature phase (Q) equivalent baseband signals generated by a digital signal conditioning unit 302. The first frequency shift changes the frequency of the equivalent baseband signals by a shift amount ($\Delta f$) in a first direction (toward origin). A second offset generation circuit 312 is configured to introduce a second frequency shift into an oscillator output signal generated by a local oscillator 310. The second frequency shift changes the frequency of the oscillator output signal by the shift amount in a second direction, opposite that of the first direction (away from origin).

A modulation circuit 307 is configured to perform a modulation of the offset equivalent baseband signals onto offset local oscillator output signals, formed from the oscillator output signal, to generate a composite modulated signal $S_{COMP}$.

The signal conditioning unit 302 (e.g., baseband processor) is configured to generate modulation information that is split into digital original in-phase (I) and quadrature phase (Q) equivalent baseband signals having a frequency range centered around zero Hz (e.g., −8 MHz to 8 MHz). The original in-phase (IORIG) and quadrature phase (QORIG) equivalent baseband signals are provided to the first offset generation circuit 304 configured to selectively introduce the first frequency shift (e.g., comprising KHz or MHz frequency shift) into the original in-phase and quadrature phase equivalent baseband signals, IORIG and QORIG, to generate offset or shifted in-phase IOFFSET and offset quadrature phase QOFFSET equivalent baseband signals.

The transmission circuit 300 is configured to operate in a bypass mode or in a shift mode. Operation in the bypass mode will result in the original equivalent baseband signals, IORIG and QORIG, being provided to respective digital-to-analog converters, 306a and 306b, located downstream of the first offset generation circuit 304. Operation in the shift mode will result in the offset equivalent baseband signals, IOFFSET and QOFFSET, being provided to respective the digital-to-analog converters, 306a and 306b. The digital-to-analog converters, 306a and 306b, are configured to convert the digital equivalent baseband signals to analog equivalent baseband signals.

A selection circuit 320 (e.g., comprising one or more switches, one or more multiplexors, etc.) is be located upstream or downstream of the first offset generation circuit 304. The selection circuit 320 is configured to selectively provide the original or offset/shifted equivalent baseband signals to the digital-to-analog converters 306, so that either one of the original in-phase equivalent baseband signal IORIG or the offset in-phase equivalent baseband signal IOFFSET are selectively provided to digital-to-analog converter 306a, while one of the original quadrature phase equivalent baseband signal QORIG or the offset quadrature phase equivalent baseband signal QOFFSET are selectively provided to digital-to-analog converter 306b.

A second offset generation circuit 312 is coupled to local oscillator 310 (e.g., a digitally controlled oscillator, a voltage controlled oscillator, etc.). The second offset generation circuit 312 is configured to selectively cause the local oscillator 310 to vary the frequency of an oscillator output signal SOSC by introducing the second frequency shift, also by the shift amount Δf, but in the second direction (away from origin). In particular, when the transmission circuit 300 operates in the bypass mode the second offset generation circuit 312 causes the local oscillator 310 to generate an original oscillator output signal SOSC without the second frequency shift. Alternatively, when the transmission circuit 300 operates in the shift mode the second offset generation circuit 312 causes the local oscillator 310 to generate an offset oscillator output signal SOSC' comprising the second frequency shift.

The oscillator output signal (e.g., the original oscillator signal SOSC or the offset oscillator signal SOSC') is provided to a quadrature divider 314. The quadrature divider 314 is configured to divide the frequency of the oscillator output signal by a division factor D to generate local oscillator signals. Note that the division factor determines the effective frequency shift of the oscillator in the following way: if the wanted frequency shift at LOI and LOQ is Δf then the applied frequency shift at oscillator output is D Δf (increased by the division factor). As shown in FIG. 3, the quadrature divider 314 generates a first local oscillator signal LOI(0°) and a second local oscillator signal LOQ(90°), wherein the first and second local oscillator signals are offset by 90°. The local oscillator signals are respectively provided to the up-conversion mixers 308a and 308b (e.g., a first local oscillator signal is provided to mixer 308a and a second local oscillator signal offset by 90° is provided to mixer 308b, or vice versa).

The analog equivalent baseband signals, output from DAC 306a and 306b, are also provided to the up-conversion mixers 308a and 308b. The up-conversion mixers 308a and 308b are configured to modulate the analog equivalent baseband signals onto the local oscillator signals to generate mixer output signals, which are combined by an adder 316 to form a composite modulated output signal SCOMP having amplitude and phase modulation. The composite modulated output signal SCOMP is provided to one or more amplification stages 318 before being received by a downstream antenna for transmission.

In one example, the shift amount Δf is selected by the offset generation component 304. Alternatively, a controller or other circuit can select the shift amount. The shift amount is selected to shift the unwanted components, including the IM3 component out of the range of specified limits, such as the co-existence limits. As shown above, the IM3 component is shifted by 4Δf. The spectral widening of the IM3 component should be taken into account in determining the shift amount. The selection circuit or controller 320 determines when to utilize the shift amount and when to use the original signals.

In one example, there are three parameters used to determine if a frequency shift is needed and the offset amount. The parameters include a number (N_RB) of allocated RBs, positions of the allocated RBs, and an output power of the composite modulated output signal.

The system 300 includes an IM3 suppression via filtering or other mechanism. The given IM3 suppression determines a maximum number N_RB where a shift has to be applied. For example, if a suppression of 61 dB is needed and the modulator 300 achieves 51 dB, then a maximum number of 10 RBs are considered because the spectral density of 10 RBs is already reduced by a factor of ten for a given output power and thus reducing the IM3 component inherently by 10 dB.

The position of the RBs to be shifted is determined by the related position of the IM3 products falling into the restricted area defined by the co-existence limits.

The shift is applied in the range around maximum output power Pout_max because, linearity requirements of the transmitter 300 are gating. A worst case is 1 RB allocation at Pout_max, which produces the highest possible IM3 component. Only a few dB below Pout_max the IM3 component is small enough that the shift can be switched off.

Generally, switching the frequency shift feature on and off is applied dynamically to take into account the changing RB allocation and output power condition which typically occurs on a sub-frame base (e.g., 1 ms).

The composite modulated signal includes a resource block (RB) component at a targeted frequency specified by the carrier frequency and the baseband modulation frequency, $f_c+f_m$. The RB component is the wanted or desired signal for transmission. It is noted that the RB component is at the sum of the carrier frequency and the baseband modulation frequency for both bypass and shift modes.

For the shift mode, the IM3 component is positioned or shifted by 4Δf. The IOFFSET is shifted by Δf in the first direction. The SOSC' is shifted by Δf in the second direction. The image component is centered about a frequency specified by the $f_c-f_m$, but shifted by an amount (2Δf).

Figure 4:
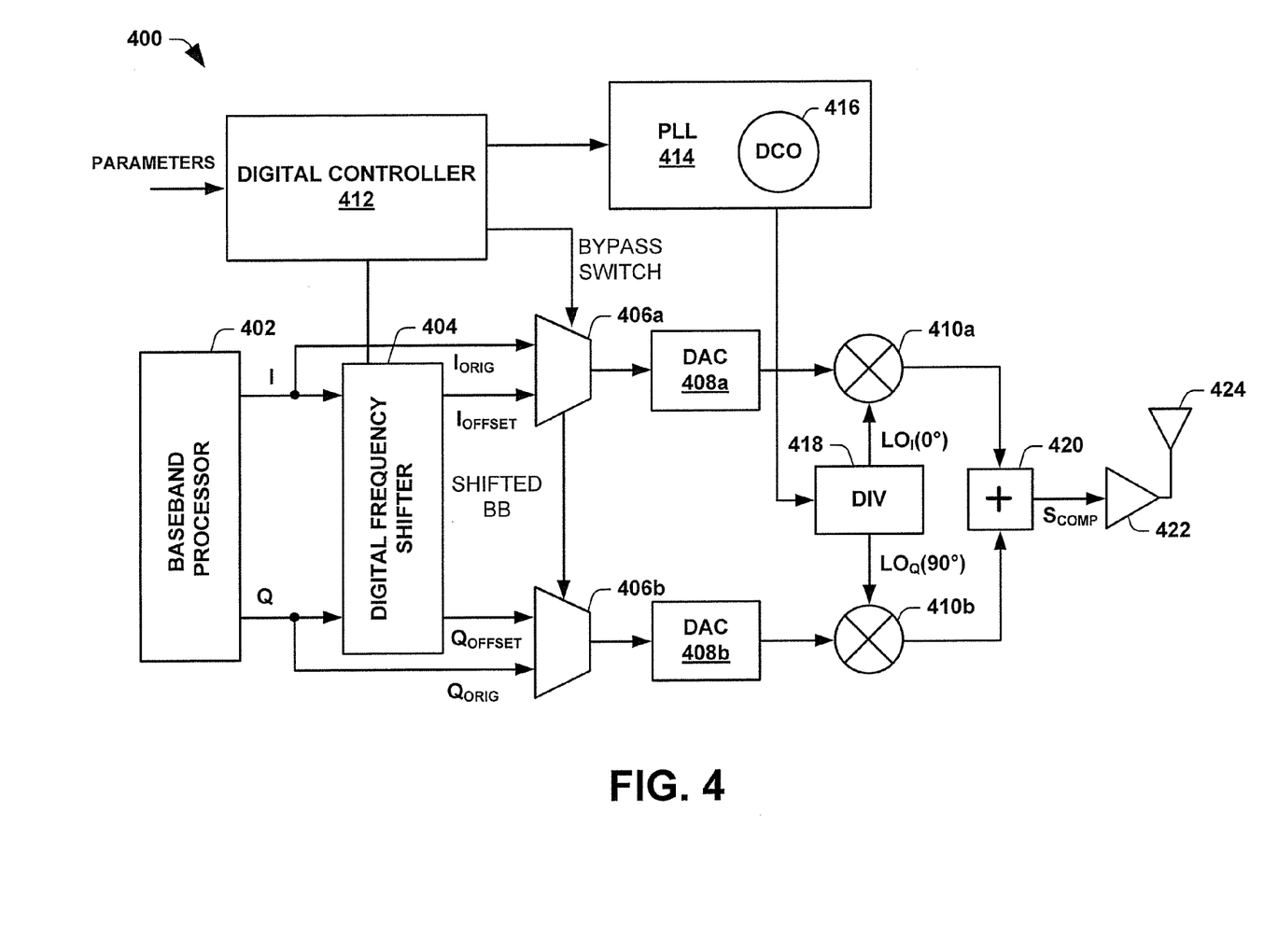
FIG. 4 is a more detailed diagram illustrating a transmission circuit for frequency shifting unwanted signal components.

FIG. 4 is a more detailed diagram illustrating a transmission circuit 400 for shifting unwanted signal components. The transmission circuit 400 shifts unwanted signal components, such as IM3 components, away from limits such as co-existence limits.

A baseband processor 402 is configured to generate modulation information that is split into digital in-phase (I) and quadrature phase (Q) equivalent baseband signals in a frequency range around zero Hz. The I and Q equivalent baseband signals are provided to a digital frequency shifter 404 configured to introduce a frequency shift amount into the original in-phase and quadrature phase equivalent baseband signals, $I_{ORIG}$ and $Q_{ORIG}$, to generate an offset or shifted in-phase equivalent baseband signal $I_{OFFSET}$ and an offset or shifted quadrature phase equivalent baseband signal $Q_{OFFSET}$. The frequency shift amount is towards the origin for the baseband signals.

The original and the offset in-phase equivalent baseband signals are provided to a first multiplexor 406a. The original and the offset quadrature-phase equivalent baseband signals are provided to a second multiplexor 406b. The first and second multiplexors, 406a and 406b, are operated according to a first control signal $S_{CRTL}$ provided by a digital controller 412. In particular, the digital controller 412 may be configured to operate the transmission circuit 400 in a bypass mode or in a shift mode. Operation in the bypass mode will result in the multiplexors, 406a and 406b, providing the original equivalent baseband signals, $I_{ORIG}$ and $Q_{ORIG}$, to digital-to-analog converters, 408a and 408b. Operation in the shift mode will result in the multiplexors, 406a and 406b, providing the offset/shift equivalent baseband signals, $I_{OFFSET}$ and $Q_{OFFSET}$, to the digital-to-analog converters, 408a and 408b. It will be appreciated that in various embodiments, the first and second multiplexors, 406a and 406b, may be replaced with other selection means such as electronic switches, for example.

As shown in FIG. 4, the digital controller 412 is also coupled to a tunable circuit 414, such as a phase locked loop, configured to selectively provide a desired frequency for the oscillator output signal $S_{OSC}$. Additionally, the digital controller 412 is coupled to the digital frequency shifter 404 and provides the shift amount to the digital frequency shifter 404. In one example, the tunable circuit 414 may comprise a digital controlled oscillator (DCO) 416 configured to generate an oscillator output signal (e.g., typically comprising a single frequency signal). The digital controller 412 is configured to provide a second control signal $S_{CTRL}$ to the tunable circuit 414 and/or DCO 416 that causes the tunable circuit 414 and/or DCO 416 to selectively vary the frequency of an oscillator output signal $S_{OSC}$ by the shift amount in a second direction, opposite the first direction. In particular, operation in the bypass mode will cause the tunable circuit 414 and/or DCO 416 to generate an original oscillator output signal $S_{OSC}$ without a frequency shift. Operation in the shift mode will cause the tunable circuit 414 and/or DCO 416 to generate an offset oscillator output signal $S_{OSC'}$ comprising a frequency shift by the shift amount in the second direction, away from the origin. Note that the division factor determines the effective frequency shift of the DCO in the following way: if the wanted frequency shift at LOI and LOQ is $\Delta f$ then the applied frequency shift at oscillator output is D $\Delta f$ (increased by the division factor).

The digital controller 412 selects the mode of operation and the shift amount according to shift parameters. In one example, the shift parameters include a number (N_RB) of allocated RBs, positions of the allocated RBs, and an output power of the composite modulated output signal.

A given IM3 suppression determines a maximum number N_RB where a shift has to be applied. For example, if a suppression of 61 dB is needed and the modulator 300 achieves 51 dB, then a maximum number of 10 RBs are considered because the spectral density of 10 RBs is already reduced by a factor of ten for a given output power and thus reducing the IM3 component inherently by 10 dB.

The position of the RBs to be shifted is determined by the related position of the IM3 products falling into the restricted area defined by the co-existence limits.

The shift is applied in the range around maximum output power Pout_max because, linearity requirements of the transmitter 300 are gating. A worst case is 1 RB allocation at Pout_max, which produces the highest possible IM3 component. Only a few dB below Pout_max the IM3 component is small enough that the shift can be switched off.

The digital controller 412 also controls when the shifts occur. In one example, the controller 412 receives a signal from a baseband integrated circuit to utilize the shift mode. Switching from the bypass mode to the shift mode should be done at slot boundaries to mitigate error vector magnitude (EVM) degradation of an LTE modulated signal. The 3GPP standard permits switching in the same time window a change of output power is applied. In one example, a maximum allowed time is 20 micro-seconds before or after a slot boundary depending on an ON/OFF time mask specified in 3GPP TS 36.101. However, performance of the shift can be enhanced by applying the frequency shift at a position of a cyclic prefix of the first symbol of the slot to mitigate degradation of the signal. In one example, the length of a cyclic prefix is approximately 5 micro-seconds, which is on the order of the settling time for applying the frequency shift.

The oscillator output signal $S_{OSC}$ (e.g., the original oscillator signal or the offset oscillator signal) is provided to a quadrature divider 418. The quadrature divider 418 is configured to divide the frequency of the oscillator output signal by a division factor D to generate a first local oscillator signal $LO_I(0°)$ and a second local oscillator signal $LO_Q(90°)$, wherein the first and second local oscillator signals are offset by 90°. The local oscillator signals are respectively provided to the up-conversion mixers, 410a and 410b, which mix the analog signals output from DAC, 408a and 408b, with the local oscillator signals ($LO_1(0°)$ and $LO_Q(90°)$) to generate mixer output signals. The mixer output signals are combined by an adder 420 to form a composite modulated output signal $S_{COMP}$ having amplitude and phase modulation. The composite modulated output signal $S_{COMP}$ is provided to one or more amplification stages 422 before being received by a downstream antenna 424 for transmission.

The output signal includes wanted components and unwanted components. The wanted components, such as the allocated resource block are at or about an assigned frequency, $f_c+f_m$, for both the bypass mode and the shift mode. However, only the unwanted components are shifted away from limits such as the co-existence limits for the shift mode.

Figure 5:
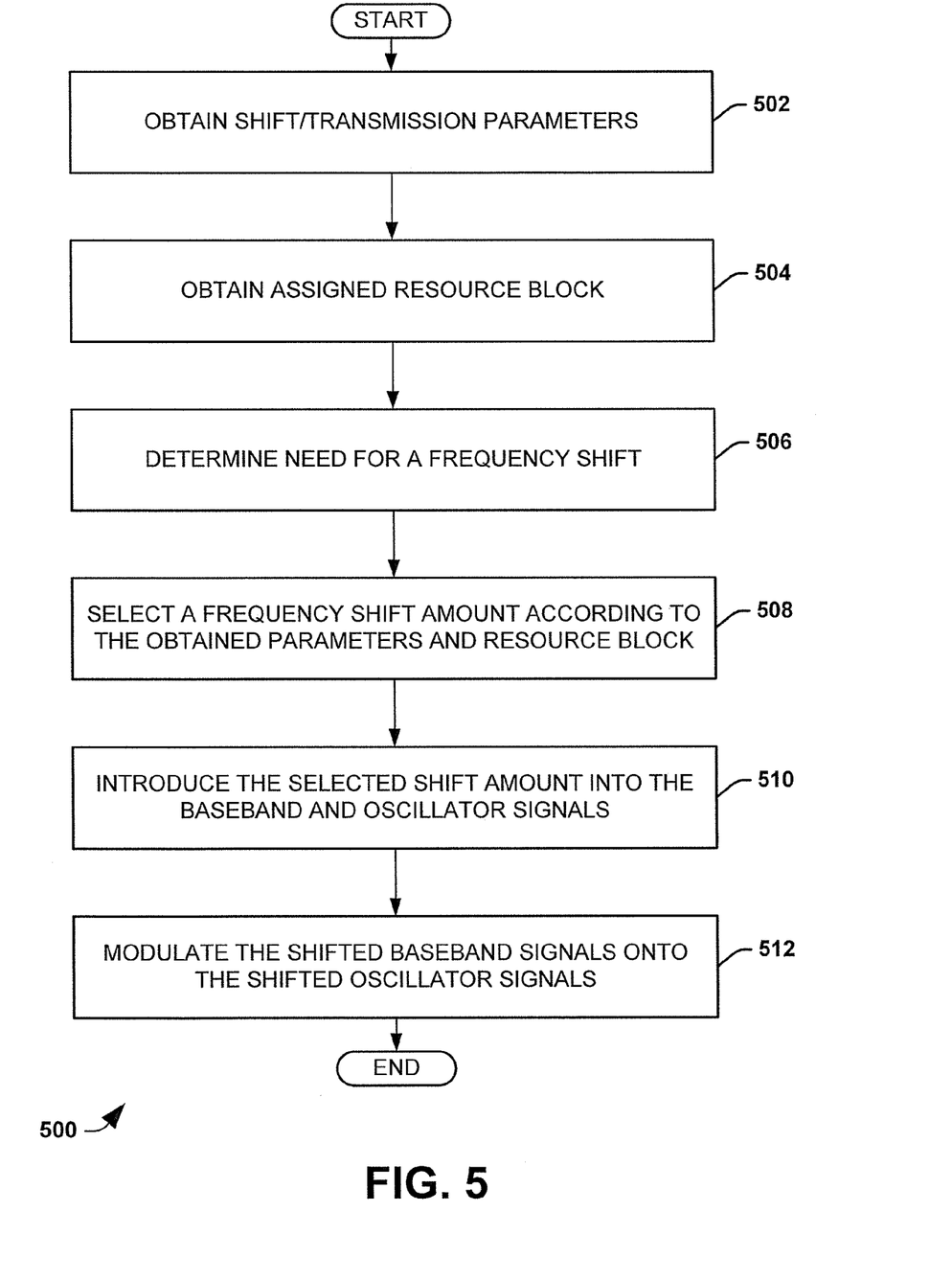
FIG. 5 is a flow diagram illustrating a method of operating a transmission circuit that frequency shifts only unwanted components.

FIG. 5 is a flow diagram illustrating a method 500 of operating a transmission circuit. The method 500 shifts unwanted components as needed to comply with requirement or limits, such as co-existence limits. Wanted components remain un-shifted and at assigned frequencies.

The method 500 begins at block 502, wherein transmission or shift parameters are obtained. The parameters include specification limits or ranges, assigned resource block(s), number of resource blocks, IM3 limits, suppression limits, linearity requirements, power output levels, bandwidth, LTE transmit bandwidth configuration and the like. In one example the parameters include a co-existence limit.

An assigned resource block for transmission is obtained at block 504. The assigned resource block has a physical bandwidth (e.g., 180 kHz) for a channel bandwidth (e.g., 20 MHz). Thus, a signal to be transmitted can utilize one or more resource blocks (e.g., 1-100) according to the channel bandwidth and required data rate or service.

A determination is made whether a shift is needed according to the parameters and the assigned resource block at block 506. The determination selects a mode, either a bypass mode wherein a shift is not introduced or a shift mode where a frequency shift is introduced. The parameters are analyzed by a controller or other circuit to determine if a shift is needed. For example, if a current suppression of unwanted components is deemed sufficient in light of the parameters, such as output power, a frequency shift is not needed and the transmitter operates in a bypass mode. However, if the current suppress of unwanted components is deemed insufficient, a frequency shift is needed and the transmitter operates in a shift mode.

A shift amount is selected according to the parameters and the assigned resource block at block 508. The shift amount is determined in order to shift the unwanted components away from target limits or ranges, such as the co-existence limits.

The shift amount is introduced into baseband signals and oscillator signals at block 510. The shift amount is introduced into the baseband signals by frequency shifting the baseband signals, I and Q, towards origin by the shift amount. The shift amount is introduced into the local oscillator signals away from origin by the shift amount. It is noted that if it is determined that a shift is not needed or, desired at block 508, a shift is not introduced at block 510.

The shifted baseband signals are modulated onto the shifted oscillator signals to generate an output signal in compliance with the transmission parameters and the assigned resource block at block 512. The output signal provides wanted components at assigned frequencies without shifting and provides at least a portion of unwanted components at shifted frequencies, such as described above. The wanted components include the assigned resource block component.

While the methods provided herein are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIG. 2, 3, etc., are non-limiting examples of circuits that may be used to implement method 500 and/or variations thereof). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A transmission circuit includes a shift circuit, a second shift circuit, and a modulation circuit. The shift circuit is configured to select a shift amount according to shift parameters and to introduce the shift amount in a first direction into in phase and quadrature phase baseband signals. The second circuit is configured to selectively introduce the shift amount in a second direction into local oscillator signals. The modulation circuit is configured to modulate the shifted baseband signals onto the shifted local oscillator signals to generate a composite modulated output signal. Unwanted components of the output signal are shifted away from specified limits. Wanted components of the output signal are unshifted.

Another transmission circuit includes a baseband component, a shift generation circuit, a frequency shift component, a bypass component, and a modulation circuit. The baseband component generates original baseband signals. The shift generation circuit is configured to generate a shift amount according to shift parameters, including an allocated resource block and a co-existence limit. The frequency shift component is configured to generate shifted baseband signals from the original baseband signals according to the shift amount. The bypass component is configured to provide selected baseband signals from the original baseband signals in a bypass mode and to provide the selected baseband signals from the shifted baseband signals in a shift mode. The modulation circuit is configured to modulate the selected baseband signals with selected oscillator signals to generate an output signal. Unwanted components of the output signal are outside the co-existence limits.

A method of operating a transmission circuit is provided. Transmission or shift parameters are obtained. The parameters include a co-existence limit. An assigned resource block allocation for transmission is obtained. A determination is made whether a frequency shift is needed according to the parameters and the assigned resource block(s). A shift amount is selected according to the parameters and the assigned resource block(s). The shift amount is introduced into shifted baseband signals and shifted oscillator signals. The shifted baseband signals are modulated onto the shifted oscillator signals to generate an output signal in compliance with the shift parameters and the assigned resource block(s).

Although the invention has been illustrated and described with respect to one or more implementations, alterations and/or modifications may be made to the illustrated examples without departing from the spirit and scope of the appended claims. For example, although the transmission circuit described herein has been illustrated as a transmitter circuit, one of ordinary skill in the art will appreciate that the invention provided herein may be applied to transceiver circuits as well. Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmission circuit comprising:
   a shift circuit configured to select a shift amount according to shift parameters and to introduce the shift amount in a first direction into in-phase (I) and quadrature phase (Q) equivalent baseband signals, wherein the shift amount is a frequency shift;

a second circuit configured to selectively introduce the shift amount in a second direction into local oscillator signals; and a modulation circuit configured to perform a modulation of the shifted baseband signals onto the shifted local oscillator signals to generate a composite modulated output signal, wherein unwanted components of the composite modulated output signal are shifted away from specified limits and wanted components are unshifted, wherein the unwanted components include an image component centered at a frequency of $f_c-f_m+2\Delta f$, where $f_c$ is a carrier frequency, $f_m$ is a baseband modulation frequency and $\Delta f$ is the shift amount.

2. The circuit of claim 1, wherein the shift parameters include a number of allocated resource blocks.

3. The circuit of claim 2, wherein the shift parameters further include an output power.

4. The circuit of claim 1, wherein the composite modulated output signal includes a resource block component.

5. The circuit of claim 4, wherein the resource block component is centered about a frequency given by a carrier frequency and a baseband modulation frequency.

6. The circuit of claim 1, wherein the unwanted components include a carrier component at a frequency of $f_c+\Delta f$, where $f_c$ is a carrier frequency of the unshifted case and $\Delta f$ is a shift amount.

7. The circuit of claim 1, wherein the unwanted components include an IM3 component centered about a frequency of $f_c-3f_m+4\Delta f$, where $f_c$ is a carrier frequency, $f_m$ is a baseband modulation frequency, $\Delta f$ is the shift amount and IM3 is a third order based component shifted from the carrier frequency by a factor of 3.

8. The circuit of claim 1, wherein the specified limits include a co-existence limit.

9. The circuit of claim 1, wherein the shift circuit includes a CORDIC configured to introduce the shift amount.

10. The circuit of claim 1, wherein the second direction is opposite the first direction.

11. A transmission circuit comprising:
a baseband component configured to generate original baseband signals;
a shift generation circuit configured to generate a shift amount according to shift parameters including an allocated resource block and a co-existence limit;
a frequency shift component configured to generate shifted baseband signals from the original baseband signals according to the shift amount;
a bypass component configured to provide selected baseband signals from the original baseband signals in a bypass mode and to provide the selected baseband signals from the shifted baseband signals in a shift mode; and
a modulation circuit configured to modulate the selected baseband signals with selected oscillator signals to generate an output signal, wherein unwanted components of the output signal are outside the co-existence limit.

12. The circuit of claim 11, wherein the bypass component is configured to use the shift mode for a range proximate a maximum output power of the output signal.

13. The circuit of claim 11, wherein the shift parameters further include a given IM3 suppression and a number of resource blocks.

14. The circuit of claim 11, wherein the shift generation circuit is configured to dynamically generate the shift amount.

15. The circuit of claim 11, further comprising an oscillator circuit that generates the selected oscillator signals.

16. The circuit of claim 11, further comprising a digital controller configured to select one of the bypass mode and the shift mode.

17. The circuit of claim 16, wherein the digital controller is configured to control the oscillator circuit to generate the selected oscillator signals with a frequency shift specified by the shift amount from the shift generation circuit.

* * * * *